US006621602B1

(12) United States Patent
Tsuji

(10) Patent No.: US 6,621,602 B1
(45) Date of Patent: Sep. 16, 2003

(54) IMAGE READING DEVICE

(75) Inventor: Junichi Tsuji, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/448,605

(22) Filed: Nov. 24, 1999

(51) Int. Cl.$^7$ .............................. H04N 1/04; H04N 1/46
(52) U.S. Cl. ....................................... 358/487; 358/506
(58) Field of Search ................................. 358/487, 506, 358/475, 509, 296, 298, 527; 348/96, 97; 355/40; 399/144; 396/311, 319, 575

(56) References Cited

U.S. PATENT DOCUMENTS

| | | | | |
|---|---|---|---|---|
| 5,568,270 A | * | 10/1996 | Endo | 358/298 |
| 5,684,601 A | * | 11/1997 | Endo | 358/298 |
| 5,739,924 A | * | 4/1998 | Sano | 358/487 |
| 5,801,856 A | * | 9/1998 | Moghadam et al. | 358/527 |
| 5,850,253 A | * | 12/1998 | Inoue et al. | 348/96 |
| 5,991,010 A | * | 11/1999 | Nishio | 355/82 |
| 6,062,746 A | * | 5/2000 | Stoebe et al. | 396/575 |
| 6,297,874 B1 | * | 10/2001 | Ikeda et al. | 355/40 |

* cited by examiner

Primary Examiner—Cheukfan Lee
(74) Attorney, Agent, or Firm—Sughrue Mion, PLLC

(57) ABSTRACT

In order to able to shorten the transporting time of the image information carrier as much as possible when the processing of magnetic information and the reading of an image are performed during the same transporting movement, an image reading device which transports an elongated image information carrier on which a plurality of image frames are recorded and which is provided with a magnetic recording layer on which is recorded magnetic information, and which reads image information of each image frame, comprising a linear scanner which performs a prescan for preliminarily reading image information of each image frame and which performs a fine scan for reading image information of each image frame under reading condition set on the basis of image information obtained in the prescan, a magnetic information reading and writing section which reads magnetic information on the magnetic recording layer during the prescan and writes magnetic information during the fine scan, and transporting section which transports the image information carrier during the prescan along a transporting path at a constant speed and which, for each image frame, transports the image information carrier during the fine scan along the transporting path at a speed set for each image frame in accordance with the reading condition and transports the image information carrier in a reverse direction of a transporting direction of the fine scan by a predetermined amount, wherein the writing of the magnetic information of each image frame is performed after the transporting speed of the image information carrier has converged to within a predetermined range with regard to the transporting speed for fine scanning set for each image frame, is provided.

14 Claims, 13 Drawing Sheets

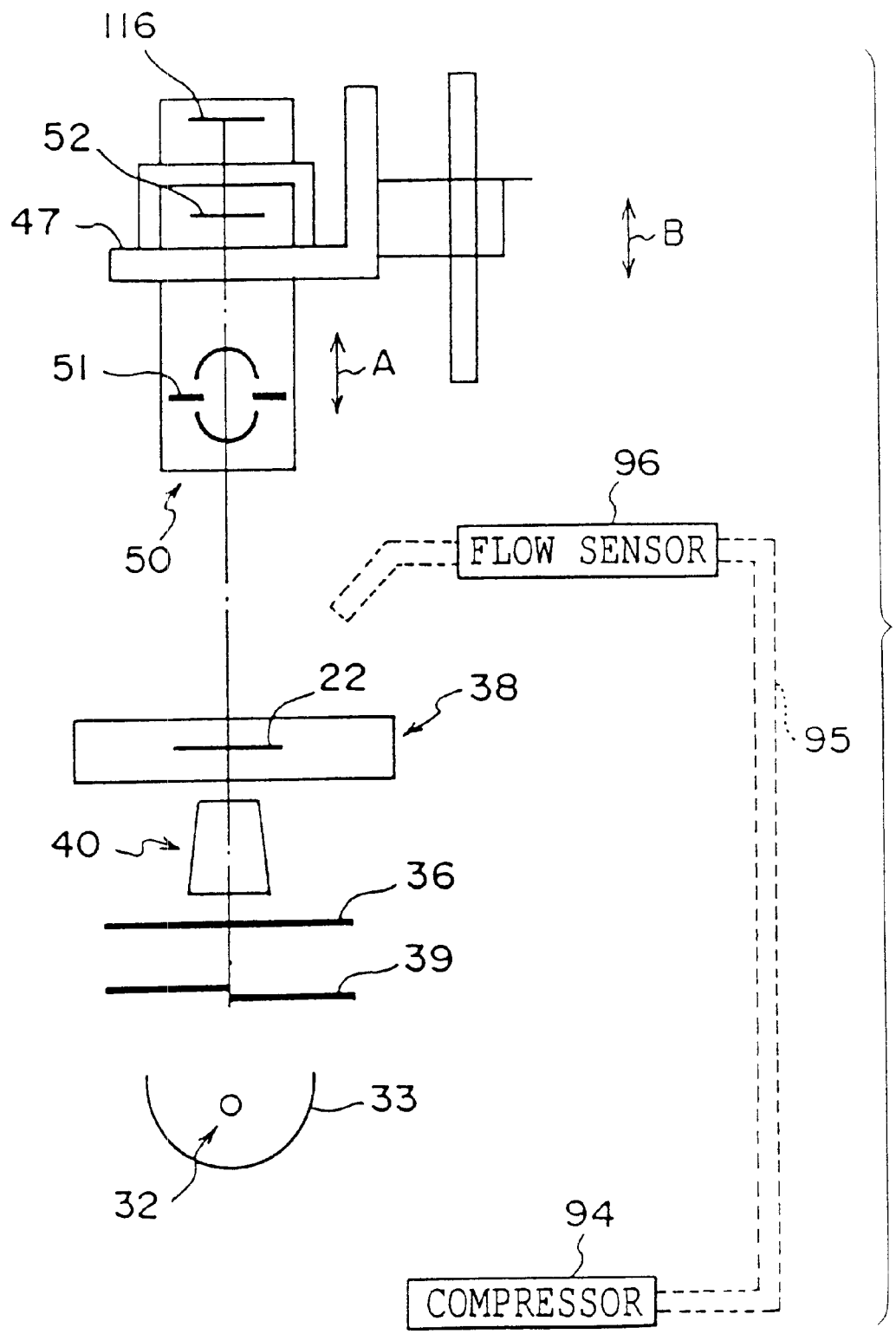

IMAGE READING DEVICE

BACKGROUND OF THE INVENTION

1. Field of the Invention

The present invention relates to an image reading device which uses a linear scanner to read a plurality of frame images while transporting an elongated information carrier on which the frame images are recorded.

2. Description of the Related Art

Recent years have seen the spread of a technology in which an image is formed on a recording material by the following process. Firstly, a frame image recorded on an image information carrier, for example, a photographic film, is photoelectrically read by a line sensor such as a CCD. The digital image data obtained from the reading is then subjected to image processings such as reduction or enlargement or various types of correction. An image is then formed on the recording material using a laser light modulated on the basis of the digital image data obtained after the image processings.

In order to achieve a precise image reading using this technology in which a frame image is digitally read by an area sensor such as a CCD, the frame image first undergoes a preliminary reading (usually called a "prescan") and reading conditions (such as the amount of light irradiated onto the frame image and the charge accumulation time of the CCD) are set in accordance with the density and the like of the frame image. The frame image is then read again under the set reading conditions (called "fine scanning").

However, when the film is the new photographic film provided with a magnetic recording layer (referred to below as "APS"), magnetic information processing tasks (reading and writing) are performed in addition to the image reading. Accordingly, four steps in a film processing series are performed, namely, reading magnetic information from the magnetic recording layer, writing magnetic information to the magnetic recording layer, prescanning using the area sensor, and fine scanning using the area sensor.

When image reading is performed using an area sensor, the transporting of the photographic film has to be stopped at the reading position for each frame in order to read the image frame. However, while the transporting is stopped, writing of the magnetic information cannot be carried out resulting in the image reading and magnetic information processing tasks taking an inconveniently long time.

For this reason, the present inventors attempted to introduce image reading using a line sensor in order to achieve a reduction in the length of time required to read an image and to process magnetic information tasks. More specifically, the prescan and the magnetic information reading are performed during the outward (forward) transporting and the magnetic information writing is performed at the same time as the fine scanning is being performed during the return transporting. This enables the four processings to be completed efficiently in one reciprocal transporting.

At this point, the writing of the magnetic information requires the transporting speed to be constant, however, the transporting speed during fine scanning differs for each image frame on the basis of the reading conditions. Accordingly, if magnetic information writing is started at a transporting speed for fine scanning a particular image frame, then even if the fine scanning of that image is completed, if the writing of the magnetic information is not completed, the magnetic information writing has to be continued at the current transporting speed. As a result of this, when a particular image frame is fine scanned, the image information carrier ends up advancing partway into the next image frame in order to write the magnetic information (referred to below as "overrun"). Therefore, it has been necessary to transport the image information carrier in reverse for a predetermined distance before performing fine scanning on the next image frame.

In other words, the structure of a device which performs reading and writing of magnetic information as well as image reading during a reciprocal transportation along the same transporting path is simple, however, the distance of the overrun becomes large if accurate magnetic information processing and image reading are to be carried out, and it is unavoidable that the film image carrier has to be transported in reverse for the distance corresponding to the overrun distance. As a result, in spite of the fact that a line sensor was being used, the long length of time required to read the images of one APS film was a problem.

SUMMARY OF THE INVENTION

In consideration of the above, the aim of the present invention is to provide an image reading device capable of making the time taken to transport an image information carrier as short as possible, when magnetic information processing and image reading are performed during the same transporting.

The first aspect of the present invention is an image reading device which transports an elongated image information carrier on which a plurality of image frames are recorded and which is provided with a magnetic recording layer on which is recorded magnetic information, and which reads image information of each image frame, comprising a linear scanner which performs a prescan for preliminarily reading image information of each image frame and which performs a fine scan for reading image information of each image frame under reading condition set on the basis of image information obtained in the prescan, a magnetic information reading and writing section which reads magnetic information on the magnetic recording layer during the prescan and writes magnetic information during the fine scan, and transporting means which transports the image information carrier during the prescan along a transporting path at a constant speed and which, for each image frame, transports the image information carrier during the fine scan along the transporting path at a speed set for each image frame in accordance with the reading condition and transports the image information carrier in a reverse direction of a transporting direction of the fine scan by a predetermined amount, wherein the writing of the magnetic information of each image frame is performed after the transporting speed of the image information carrier has converged to within a predetermined range with regard to the transporting speed for fine scanning set for each image frame.

According to the first aspect of the present invention, it is possible to start the writing of the magnetic information of an image frame after the transporting speed of an image information carrier has converged to within a predetermined range with respect to the transporting speed for fine scanning set for an image frame (either the image frame being fine scanned or another image frame). In this case, because the magnetic information writing requires the transporting speed to converge to within a predetermined range on either side of a constant speed, if the magnetic information writing takes longer than the fine scan, the image information carrier ends up being transported to a position partway into the next image frame at the transporting speed for fine scanning set by the reading conditions (called "overrun" below). However, in the present invention, because it is possible to perform the image information writing after transporting speed of the image information carrier has converged to within a predetermined range with regard to the transporting speed for fine scanning, namely, because it is possible to perform the image information writing prior to the fine scanning, the distance of the overrun can be controlled to a minimum. Accordingly, the processing time required for the image information carrier can be made as short as possible.

Note that because the image information carrier is transported at a constant speed during the prescan, the reading of the magnetic information can be performed at the same time.

The second aspect of the present invention is an image reading device according to the first aspect of the present invention in which the magnetic information reading and writing section is disposed at a position where, at the same time as the linear scanner starts the fine scanning of one of the image frames, the writing of magnetic information for one of the image frames can be started.

According to the second aspect of the present invention, at the same time as the linear scanner starts performing the fine scanning of an image frame, the magnetic information reading and writing section can start performing magnetic information writing for an image frame (either for another image frame or the image frame being fine scanned). Accordingly, the writing of the magnetic information can be performed after the transporting speed of the image information carrier has definitely converged to within a predetermined range.

The third aspect of the present invention is an image reading device according to the first or second aspect of the present invention in which a distance between a writing position where magnetic information writing is performed on the image information carrier by the magnetic information reading and writing section and a reading position where image reading is performed on the image information carrier by the linear scanner is an integral multiple of a pitch of the image frame.

According to the third aspect of the present invention, for example, when the fine scanning of a particular frame image is started, the writing of the magnetic information of the next frame image to the magnetic recording layer of the next frame image can be started. Accordingly, the writing of the magnetic information can be started at the same time of performing the fine scan, and the processing time can be reduced.

The fourth aspect of the present invention is an image reading device according to the first, second or third aspect of the present invention, in which the transporting of the image information carrier is stopped at the same time as the fine scanning of each image frame by the linear scanner and the writing of the magnetic information for each image frame have been completed.

In which the transporting of the image information carrier is stopped after the fine scanning of an image frame by the linear scanner and the writing of the magnetic information have been completed.

According to the fourth aspect of the present invention, by stopping the transporting of the image information carrier immediately after the fine scanning of an image and the writing of magnetic information have been completed, the overrun distance can be controlled to a minimum.

BRIEF DESCRIPTION OF THE DRAWINGS

FIG. 5 is a diagram showing only the principal portions of an optical system of the image reading device according to an embodiment of the present invention.

DESCRIPTION OF THE PREFERRED EMBODIMENTS

An embodiment of the present invention will now be explained with reference to the figures.

Figure 1:
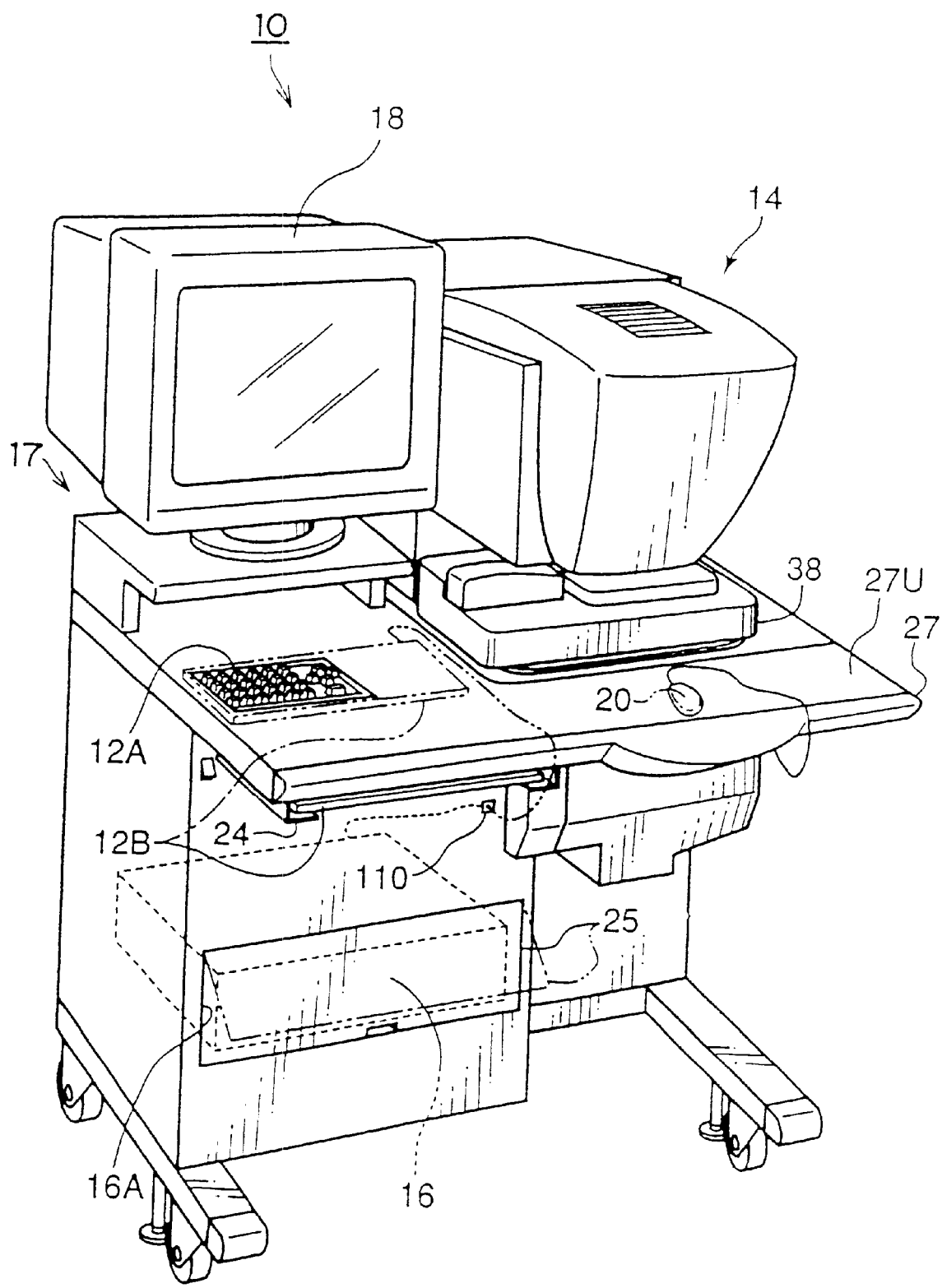
FIG. 1 is a perspective view showing the entirety of the image reading device according to an embodiment of the present invention.

As is shown in FIG. 1, the image reading device 10 according to the present embodiment is basically formed from a linear CCD scanner 14, an image processing section 16, and a work section 17.

The work section 17 is formed from a mouse 20 provided on a work table 27, two types of keyboard 12A and 12B, and a display unit 18.

One keyboard 12A is embedded into the work surface 27U of the work table 27, while the other keyboard 12B is housed in a drawer 24 of the work table 27 when not in use and is brought out of the drawer 24 and placed on top of the keyboard 12A to be used. At this time, the cord of the keyboard 12B is connected to a jack 110 connected to the image processing section 16.

The cord of the mouse 20 is connected to the image processing section 16 via a hole 108 (see FIG. 2) provided in the work table 27.

The image processing section 16 is housed in a housing section 16A provided in the work table 27 and is enclosed by a door 25. Note that the image processing section 16 is taken out by opening the door 25.

The linear CCD scanner 14 is designed to read film images recorded on photographic films such as negative film and reversal film. The linear CCD scanner 14 is able to read film images on, for example, size 135 photographic film, size 110 photographic film, photographic film having a transparent magnetic layer formed thereon (size 240 photographic film—known as APS film), and size 120 and 220 photographic films (Brownie sizes). The linear CCD scanner 14 reads the film images to be read using a linear CCD 116 and outputs data of the images.

In this specification, the term "photographic film" refers to a film on which an object is photographed and which then undergoes developing processing to visualize a positive or negative image thereon.

The image processing section 16 receives image data output from the linear CCD scanner 14 and performs image processing such as various types of image correction on the input image data. The image processing section 16 then outputs the image data to an unillustrated laser printer as image data to be used for recording.

Figure 2:
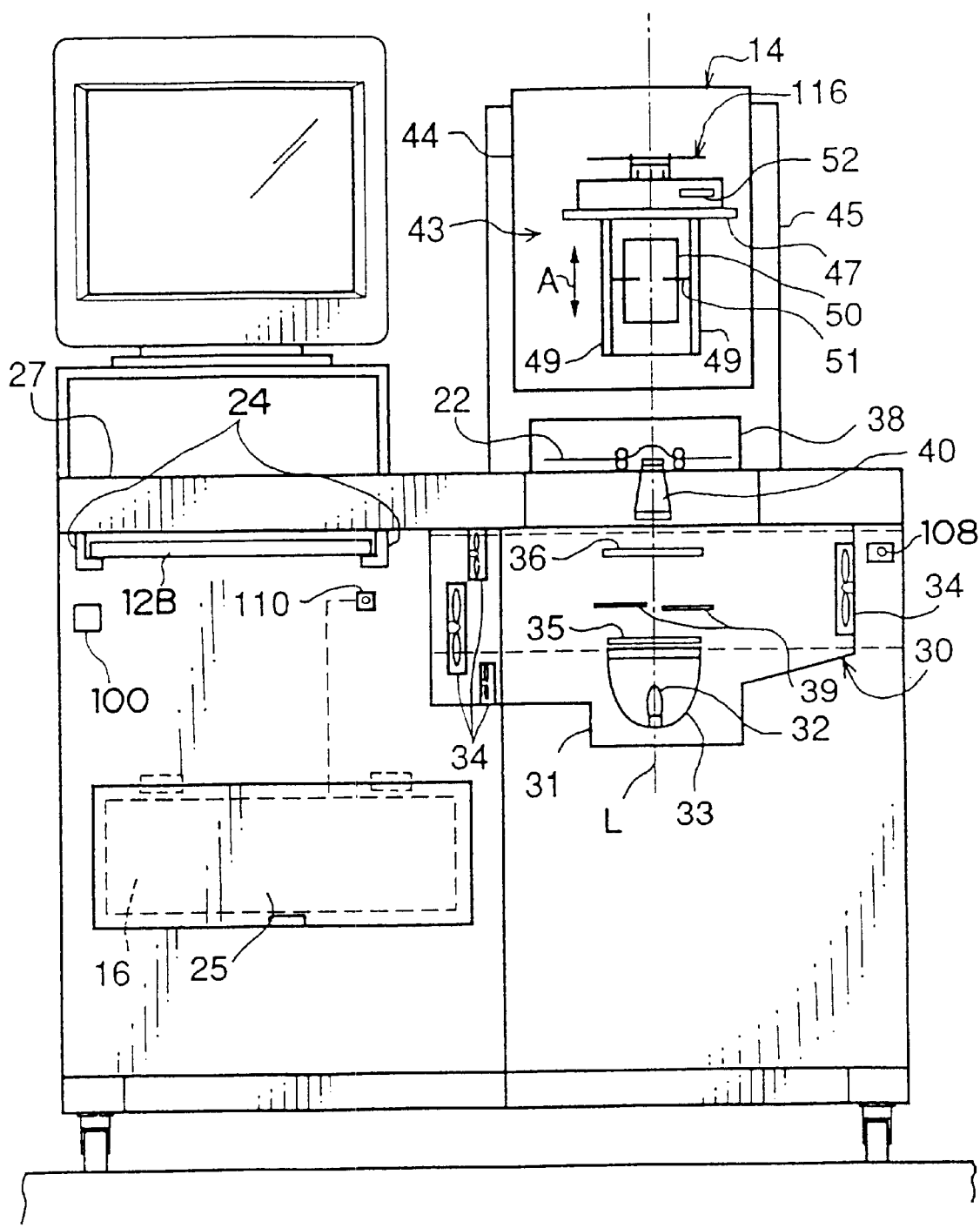
FIG. 2 is a front view showing a cross section of the optical system of the image reading device according to an embodiment of the present invention.
Figure 3:
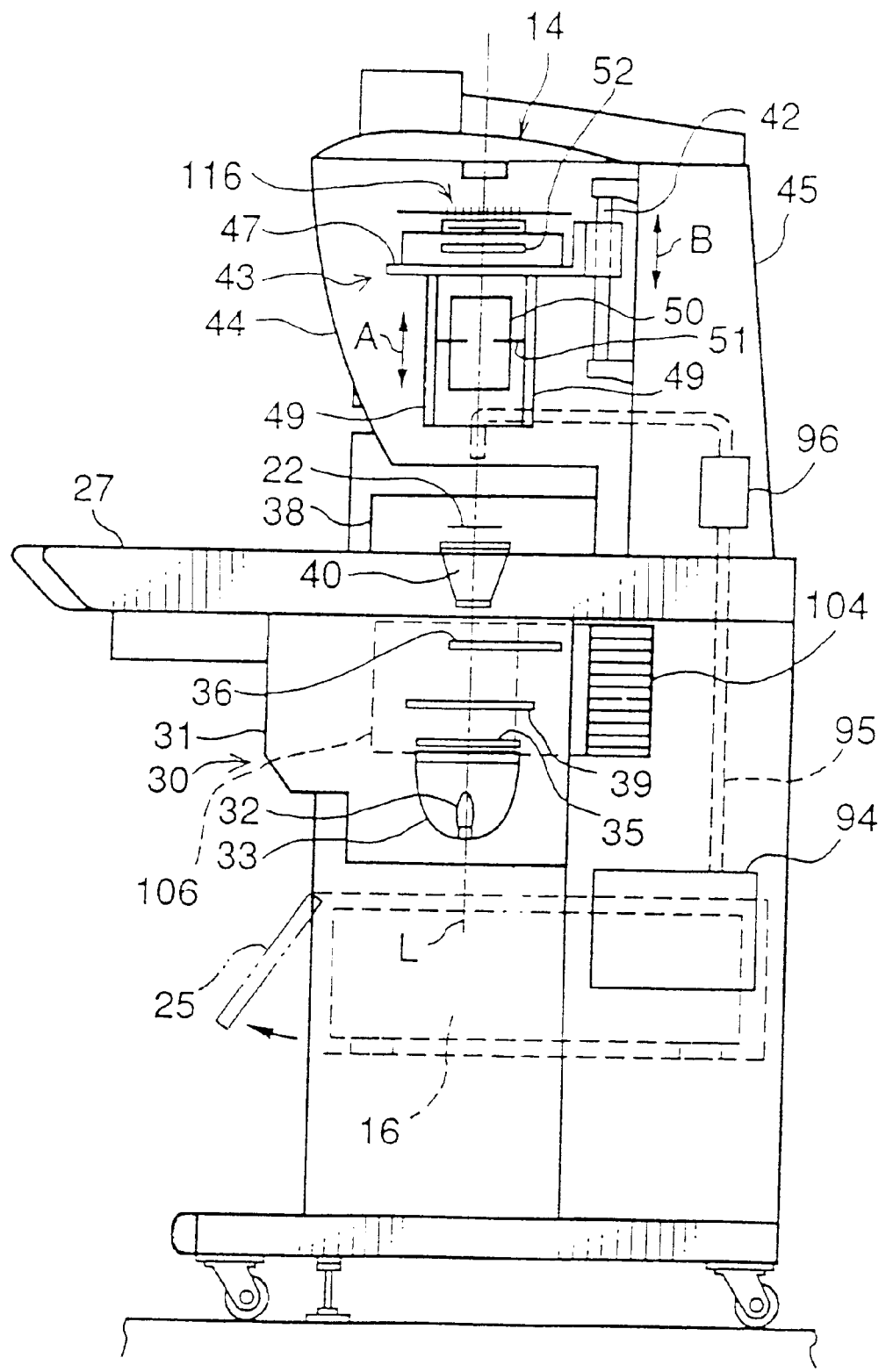
FIG. 3 is a side view showing a cross section of the optical system of the image reading device according to an embodiment of the present invention.

As is shown in FIGS. 2 and 3, the linear CCD scanner 14 optical system is provided with a halogen lamp section 30 disposed beneath the work table 27, a diffusion box 40 supported by the work table 27, a film carrier 38 which is set on the work table 27, and a reading section 43 disposed on the opposite side of the work table 27 to the halogen lamp section 30.

The halogen lamp section 30 is housed inside a metal casing 31 and a halogen lamp 32 is provided inside the metal casing 31.

A reflector 33 is disposed around the halogen lamp 32 and a portion of the light emitted from the halogen lamp 32 is reflected by the reflector 33 towards the diffusion box 44.

A plurality of lamps 34 are disposed at the sides of the reflector 33 (see FIG. 2). The fans 34 operate while the halogen lamp is turned on to prevent the inside of the casing 31 from overheating.

A UV/IR cut filter 35, a diaphragm 39, and a turret 36 are disposed in that order on the optical axis L of the light emitted from the reflector 33 on the side of the reflector 33 from which the light exits. The UV/IR cut filter 35 cuts light in the ultraviolet and infrared wavelengths thereby preventing the temperature of the photographic film 22 from rising and increasing the reading accuracy. The diaphragm 39 adjusts the amount of light from the halogen lamp 32 and the amount of reflected light from the reflector 33. The turret 36 is fitted with a balance filter 36N for negative films and a balance filter 36P for reversal films (see FIG. 4B) which set color components of the light reaching the photographic film 22 and the reading section 43 appropriate to the type of photographic film (i.e. negative film or reversal film).

Figure 4A:
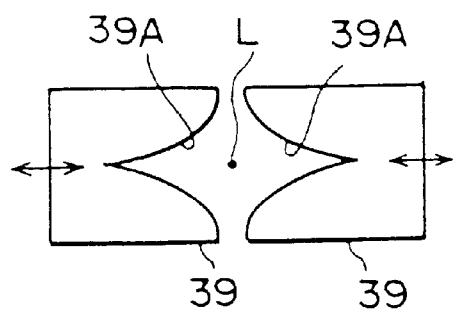
FIG. 4A is a plane view showing an example of a diaphragm, FIG. 4B a turret, FIG. 4C a lens aperture, and FIG. 4D a CCD shutter.

The diaphragm 39 comprises a pair of plate materials disposed on either side of the optical axis 39 which are able to slide closer together or further away from each other. As is shown in FIG. 4A, notches 39A are formed in one end of each of the pair of plate materials forming the diaphragm 39 running from one end of each plate material to the other end of the plate material in the direction of the sliding movement. The notches 39A are formed in such a way that the cross section of each plate material changes continuously in the direction orthogonal to the direction of the sliding movement and the notches 39A are disposed facing each other.

In the above structure, one of the filters 36N or 36P in accordance with the type of photographic film is positioned on the optical axis L so that the light has the desired color components, and the amount of light passing through the diaphragm 39 is adjusted to the desired amount by the position of the diaphragm 39.

Note that the turret is not limited to that explained above (i.e. in FIG. 4B) and the turret may be formed from a cyan filter turret 36C for absorbing red light, a magenta filter turret 36M for absorbing green light, and a yellow filter turret 36Y for absorbing violet light. A plurality of cyan filters of differing densities 36C1, 36C2, and 36C3 are inserted into the turret 36C with the density of each filter increasing in the order 36C1, 36C2, 36C3. The other turrets 36M and 36Y are structured in the same way as the turret 36C. Each turret 36C, 36M, and 36Y is also able to be rotated so that the filters selected in each turret can be superposed on top of each other on the optical axis L.

The diffusion box 40 is formed so that the closer to the top thereof, i.e. the closer to the photographic film 22, the narrower the diffusion box 40 is in the sub-scanning direction (see FIG. 2) and the wider the diffusion box 40 is in the main scanning direction (see FIG. 3).

Accordingly, light which enters into the diffusion box 40 is converged in the sub-scanning direction by the side surfaces of the diffusion box 40 so as to be irradiated onto the reading position of the photographic film 22 and also to be diffused in the main scanning direction along the reading position. As a result, the amount of light irradiated onto the reading position is increased and high quality image data can be obtained.

The diffusion box 40 is shaped so as to be wider in the main scanning direction, but it may also maintain a uniform width or be narrower in the main scanning direction.

Note that the diffusion box 40 is intended for use with a size 135 photographic film, however, a diffusion box shaped for a different photographic film may also be provided. Moreover, the light diffusing plate 120 is disposed on the light entering side of the diffusion box 40, however, it may also be disposed on the light exiting side thereof or may be disposed beneath the film carrier 38.

Like the diffusion box 40, a film carrier 38 is also provided for each type of photographic film 22 and is selected in accordance with the photographic film 22.

Long, narrow apertures (not illustrated), which are longer than the width of the photographic film 22 in the widthwise direction thereof, are provided at a position on the top and bottom surfaces of the film carrier 38 corresponding to the optical axis L. Slit light from the diffusion box 40 is irradiated onto the photographic film 22 via the aperture in the bottom surface of the film carrier 38 and light passing through the photographic film 22 reaches the reading section 43 via the aperture provided in the top surface of the film carrier 38.

An unillustrated guide is also provided in the film carrier 38 for guiding the photographic film 22 so that the photographic film 22 curves at the position where it is illuminated by slit light from the diffusion box 40 (i.e. the reading position). The guide ensures the planarity of the photographic film at the reading position.

The diffusion box 40 is also supported so that the upper surface thereof is close to the above described reading position. Accordingly, notched portions are provided in the bottom surface of the film carrier 38 to prevent the film carrier 38 and diffusion box 40 from interfering with each other when the film carrier is being loaded.

Note also that the film carrier is structured so as to be able to transport the photographic film 22 at a plurality of speeds in accordance with the density and the like of the film image during prescanning and fine scanning.

The reading section 43 is housed inside a casing 44. A loading stand 47, on the top surface of which is mounted a linear CCD, is disposed inside the casing 44 and a plurality of support rails 49 are suspended from the loading stand 47. A lens unit 50 capable of sliding in the directions indicated by the arrows A either towards or away from the work table 27 to perform changes in the magnification such as enlargement or reduction is supported by the support rails 49. A support frame 45 stands upright on the work table 27. The loading stand 47 is supported by guide rails 42 attached to the support frame 45 so as to be able to slide in the directions indicated by the arrows B either towards or away from the work table 27 in order to ensure a conjugate distance during the aforementioned magnification changes and auto focussing. The lens unit 50 is comprised of a plurality of lenses and a lens aperture 51 is disposed between the plurality of lenses. As is shown in FIG. 4C, the lens aperture is provided with a plurality of substantially C-shaped aperture plates 51A. Each aperture plate 51A is disposed uniformly around the circumference of an optical axis L, and one end of each aperture plate 51A is axially supported by a pin and is able to rotate around the pin. The plurality of aperture plates 51A are connected via an unillustrated link and rotate in the same direction when the driving force of a lens aperture drive motor (described below) is transmitted thereto. As the aperture plates 51A rotate, the area of the portion centered around the optical axis L not shaded by the aperture plates 51A (in FIG. 4C, the substantially star shaped area) changes and the amount of light which passes through the lens aperture 51 also changes.

The linear CCD 116 is provided with a plurality of photoelectric conversion elements such as photodiodes and CCD cells arranged in a line in the widthwise direction of the photographic film 22. The linear CCD 116 is also provided with sensing portions, each having an electronic shutter mechanism, arranged in three parallel lines with a space between each line. On the light entering side of each sensing portion is mounted one of either an R color separation filter, a G color separation filter, or a B color separation filter. This linear CCD structure is known as a 3 line color CCD. In the vicinity of each sensing portion are provided transmission portions each of which corresponds to a sensing portion and is comprised of a plurality of CCD cells. The electric charges which accumulate in the CCD cell of each sensing portion are transmitted in sequence via the corresponding transmission portion.

A CCD shutter 52 is also provided on the light entering side of the linear CCD. As is shown in FIG. 4D, an ND filter 52ND is set to the shutter 52. By rotating in the direction of the arrow u, the CCD shutter 52 switches between the following states: a fully closed state in which no light is allowed to enter the linear CCD 116 in order to perform darkness correction (i.e. a portion of the CCD shutter 52 where the ND filter 52ND is not inserted, such as the portion 52B, is positioned at the position 52C which includes the optical axis L); a fully open state in which light is allowed to enter the linear CCD 116 in order to perform lightness correction and normal reading (the state shown in FIG. 4D; and a reduced light state in which the light entering the linear CCD 116 is reduced by the ND filter 52ND in order to perform linearity correction (the ND filter 52 ND is positioned at the position 52C).

As is shown in FIG. 3, a compressor 94 for generating a cooling wind to cool the photographic film 22 is disposed under the work table 27. The cooling wind generated by the compressor 94 is supplied via feed pipes 95 to an unillustrated section where the film carrier 38 is read. This allows the area at the position where the photographic film 22 is read to be kept cool. Note that the feed pipes 95 pass through a flow sensor 96 for detecting the flow amount of the cooling wind.

The schematic structure of the electrical system of the linear CCD scanner 14 and the image processing section 16 FIG. 5 will now be described using FIG. 6, while also referring to the main portions of the optical system of the linear CCD scanner 14.

The linear scanner 14 is provided with a microprocessor 46 which manages the overall control of the linear CCD scanner 14. RAM 68 (e.g. SRAM) and ROM 70 (e.g. ROM capable of having the contents stored therein rewritten) are connected to the microprocessor 46 via a bus 66. In addition, the microprocessor 46 is connected to a lamp driver 53, a compressor 94, a flow sensor 96, and a motor driver 48. The lamp driver 53 turns a halogen lamp 32 on and off in response to a signal from the microprocessor 46. The microprocessor 46 also operates the compressor 94 so that cooling wind is supplied to the photographic film 22 when a film image on the photographic film 22 is being read. Note that the amount of flow of the cooling wind is detected by the flow sensor 96 so that the microprocessor 46 is able to detect any abnormalities.

Figure 4B:
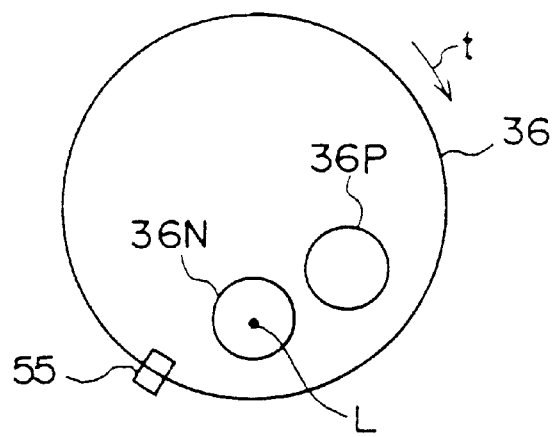
Figure 4C:
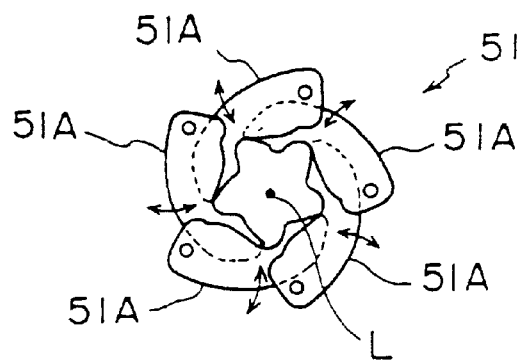
Figure 4D:
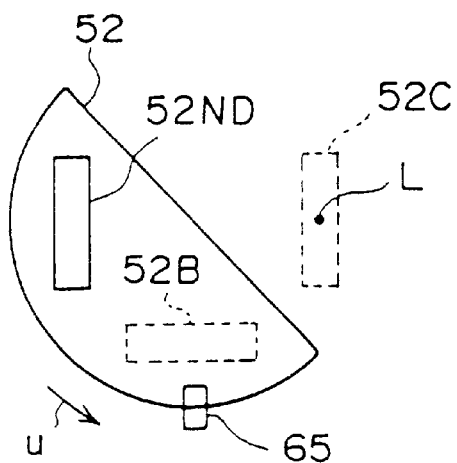

A turret drive motor 54 for driving the turret 36 to rotate in the direction shown by the arrow t in FIG. 4B so that one of either the balance filter N for negative films of the turret 36 or the balance filter P for reversal films of the turret 36 is positioned over the optical axis L, and a turret position sensor 55 for detecting the reference position (an unillustrated notch) of the turret 36 (see also FIG. 4B) are connected to the motor driver 48. A diaphragm drive motor 46 for sliding the diaphragm 39, a diaphragm position sensor 57 for detecting the position of the diaphragm 39, a reading section drive motor 58 for sliding the loading stand 47 (i.e. the linear CCD and the lens unit 50) along the guide rails 42, a reading section position sensor 59 for detecting the position of the loading stand 47, a lens driving motor 60 for sliding the lens unit 50 along the guide rails 49, a lens position sensor 61 for detecting the position of the lens unit 50, a lens aperture drive motor 62 for rotating the aperture plates 51A of the lens aperture 51, a lens aperture position sensor 63 for detecting the position of the lens aperture 51 (i.e. the position of the lens aperture plates 51A), a shutter drive motor 64 for switching the CCD shutter 52 between a fully closed state, a fully open state, and a reduced light state, a shutter position sensor 65 for detecting the shutter position, and a fan drive motor 37 for driving the fan 34 are further connected to the motor driver 48.

When a prescan (preliminary reading) or fine scan (main reading) is performed by the linear CCD, the microprocessor 46 adjusts the light irradiated onto a film image by rotating the turret 36 via the turret drive motor 54 and sliding the diaphragm 39 via the diaphragm drive motor 56 on the basis of the positions of the turret 36 and diaphragm 39 detected by the turret position sensor 55 and the diaphragm position sensor 57.

The microprocessor 46 also determines the zoom magnification in accordance with the size of the film image and whether or not trimming is to be performed. The microprocessor 46 also slides the loading stand 47 via the reading section position sensor 59 on the basis of the position of the loading stand 47 detected by the reading section position sensor 59, so that the film image can be read by the linear CCD 116 at the determined zoom magnification. In addition, the microprocessor 46 slides the lens unit 50 via the lens drive motor 60 on the basis of the position of the lens unit 50 detected by the lens position sensor 61.

Note that when autofocus control is performed to match the light receiving surface of the linear CCD 116 with the film image focus position using the lens unit 50, the microprocessor 46 only slides the loading stand 47 using the reading section drive motor 58. This autofocus control can be performed so that, for example, the contrast of the film image read by the linear CCD 116 is at the maximum (known as the image contrast method), or it can be performed instead by providing a distance sensor for measuring the distance between the photographic film 22 and the lens unit 50 (or the linear CCD 116) using infrared or the like and performing the autofocus control on the basis of the distance detected by the distance sensor instead of by using data of the film image.

A timing generator 74 is also connected to the linear CCD 116. The timing generator 74 generates various types of timing signal (clock signal) for operating the linear CCD 116, the A/D converter 82 (described below), and the like. The signal output terminal of the linear CCD is connected via an amplifier 76 to the A/D converter 82. Signals output from the linear CCD 116 are amplified by the amplifier 76 and converted into digital data by the A/D converter 82.

The output terminal of the A/D converter 82 is connected to the image processing section 16 via a correlation dual sampling circuit (CDS) 88, and an interface circuit (I/F) 90 in that order. In the CDS 88, feedthrough data indicating the level of a feedthrough signal and pixel data indicating the level of a pixel signal are sampled and the feedthrough data is subtracted from the pixel data for each pixel. The results of the calculation (pixel data which corresponds accurately to the accumulated charge amount in each CCD cell) are then output in sequence as scan image data to the image processing section 16 via the I/F circuit 90.

Note that because the R, G, B photometric signals from the linear CCD 116 are output in parallel, three signal processing systems each comprising an amplifier 76, an A/D converter 82, and a CDS 88 are also provided and the R, G, B image data from the I/F circuit 90 is input in parallel into the image processing section 16 as scan image data.

The aforementioned display unit 18, keyboards 12A and 12B, the mouse 20, and the film carrier 38 are also connected to the image processing section 16. Accordingly, the image processing section 16 controls the transporting of the photographic film 22 using the film carrier 38. The image processing section 16 also displays frame images read by the linear CCD scanner 14 on the display unit 18 or displays on the display unit 18 an estimation of how these images will appear when recorded on printing paper. It is also possible to reflect image corrections and the like instructed by an operator via the keyboard 12A in the image processing conditions.

In the present embodiment, two readings of different resolutions are performed in the linear scanner 14 of each frame image. In the first reading which is performed at a comparatively low resolution (referred to below as a "prescan"), the frame image can be read under reading conditions (i.e. the amount of light in each R, G, B wave length region of the light irradiated onto a photographic film and the CCD charge accumulation time) determined so that saturation of the charge accumulation in the linear CCD 116 does not occur even when the density of the frame image is extremely low (as in, for example, an overexposed negative image on a negative film). The image data obtained from this prescan (prescan image data) is input to the image processing section 16.

In the second reading which is performed at a comparatively high resolution (referred to below as a "fine scan"), the frame image is read under reading conditions set on the basis of the prescan image data.

(The Structure of a Film Carrier for an APS Film)

Figure 8:
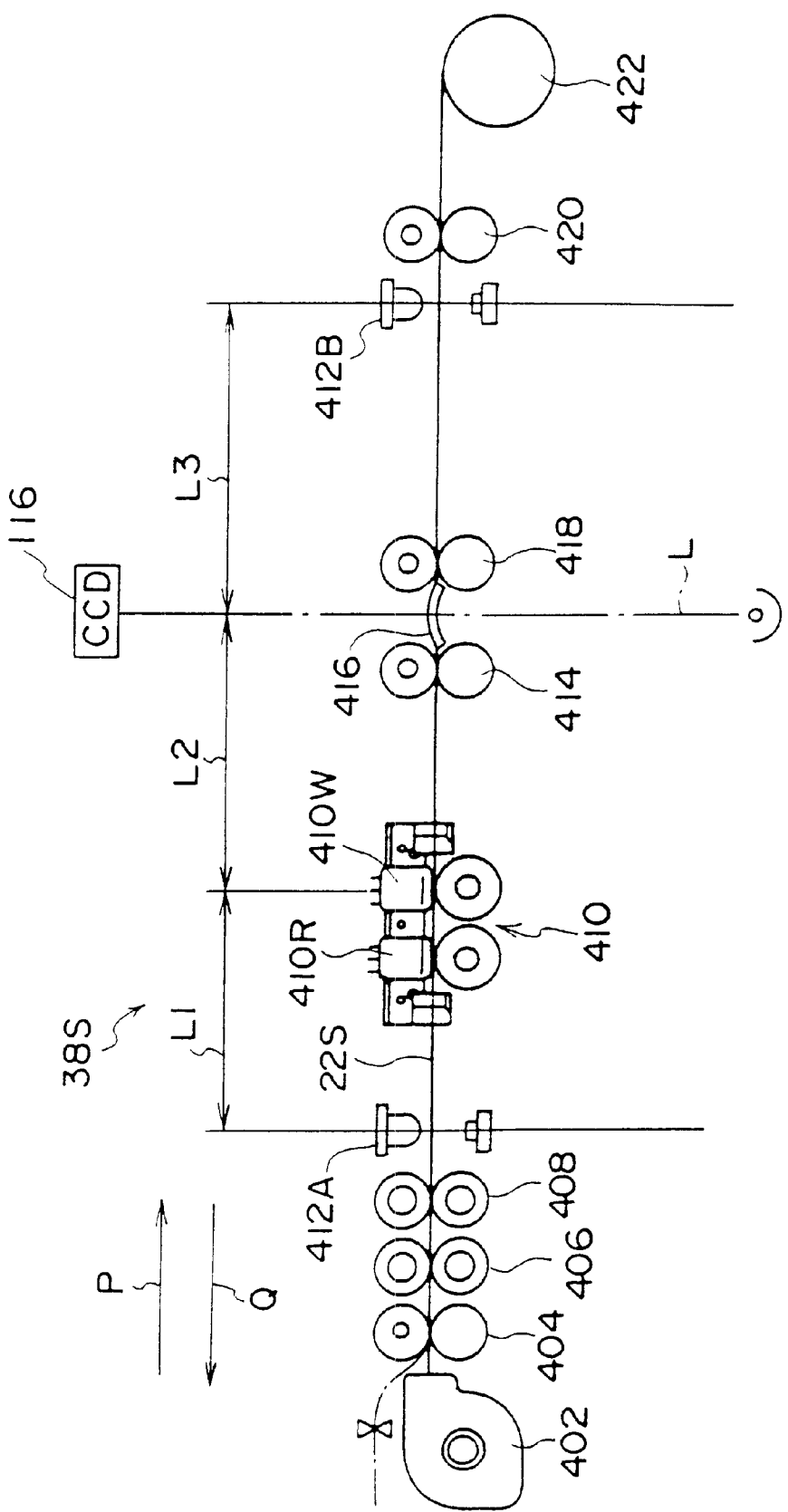
FIG. 8 is a schematic diagram showing the film carrier transporting system according to an embodiment of the present invention.

FIG. 8 is a schematic diagram showing the transport system of a film carrier 38S for an APS film (the cabinet of the film carrier 38S is omitted from the figure).

A cartridge 402 housing an APS film 22S is set at a predetermined position in the film carrier 38S. Pairs of transporting rollers of various types (described later) are disposed along the direction in which the APS film 22S is withdrawn from the set cartridge 402. Note that the direction indicated by the arrow P which is the direction in which the APS film 22S is withdrawn is referred to below as the withdrawal direction, while the direction indicated by the arrow Q which is the direction in which the APS film is taken up and housed is referred to below as the take-up direction.

Various devices are provided along the withdrawal direction (the direction of the arrow P) from the predetermined position where the cartridge 402 is set. In sequence these are: a pair of transporting rollers 404; a pair of dust removing rollers 406 for removing dust from the top surface of the APS film 22S; a pair of dust removing rollers 408 for removing dust from the top surface of the magnetic recording layer formed on the rear surface of the APS film 22S (this pair removes the dust from both edges of the APS film 22S in the widthwise direction thereof; a perforation sensor 412A for detecting the perforations 28 in the APS film 22S shown in FIG. 11; a magnetic information reading and writing section 410 provided with a magnetic head 410R (the upstream head when the film is being withdrawn) for reading magnetic information from the magnetic track of the APS film 22S and a magnetic head 410W (the downstream head when the film is being withdrawn) for writing magnetic information to the same magnetic track (this section reads and writes the magnetic information at both edges of the APS film 22S in the widthwise direction thereof); a pair of transporting rollers 414; a film support member 416 for holding the position of the APS film 22S on the optical axis relative to other optical systems at the frame image scanning position; a pair of transporting rollers 418; a perforation sensor 412B for detecting perforations 28 in the APS film 22S; a pair of transporting rollers 420; and a temporary take-up portion 422 onto which the APS film 22S is temporarily wound.

From among these, the bottom roller of each of the pairs of transporting rollers 404, 414, 418, and 420 is the drive roller, while the top roller is the slave roller.

The film carrier 38S is also provided with an unillustrated motor which acts as the drive source for the pairs of transporting rollers 404, 414, 418, and 420. The drive shaft of the motor and the drive shafts of the pairs of transporting rollers 404, 414, 418, and 420 are connected by an unillustrated multistage gearing mechanism which comprises a plurality of endless belts, pulleys of varying diameters, and the like. The speed of rotation of the drive shafts of the pairs of transporting rollers 404, 414, 418, and 420 are changed by the multistage gearing mechanism, thereby enabling the speed at which the APS film 22S is transported to be varied.

The substantially central portion between the pairs of transporting rollers 414 and 418 is the scanning position of the APS film 22S by the linear CCD 116. A slit shaped hole for scanning light is provided in the film support member 416 as well as directly above and directly below the scanning position in the unillustrated cabinet of the film carrier 38S. Namely, as is shown in FIG. 3, scanning light is irradiated from below at the scanning position onto the APS film 22S which is transported through the interior of the film carrier 38S and the light which passes through the APS film 22S reaches the linear CCD sensor provided above the film carrier 38S. Note that, although omitted from the figures, a film extracting mechanism for automatically feeding the leading edge of the APS film 22S from the cartridge 402 to the nipping portion of the pair of transporting rollers 404 when the cartridge 402 is set in the position shown in FIG. 8 is also integrated in the film carrier 38S.

Figure 6:
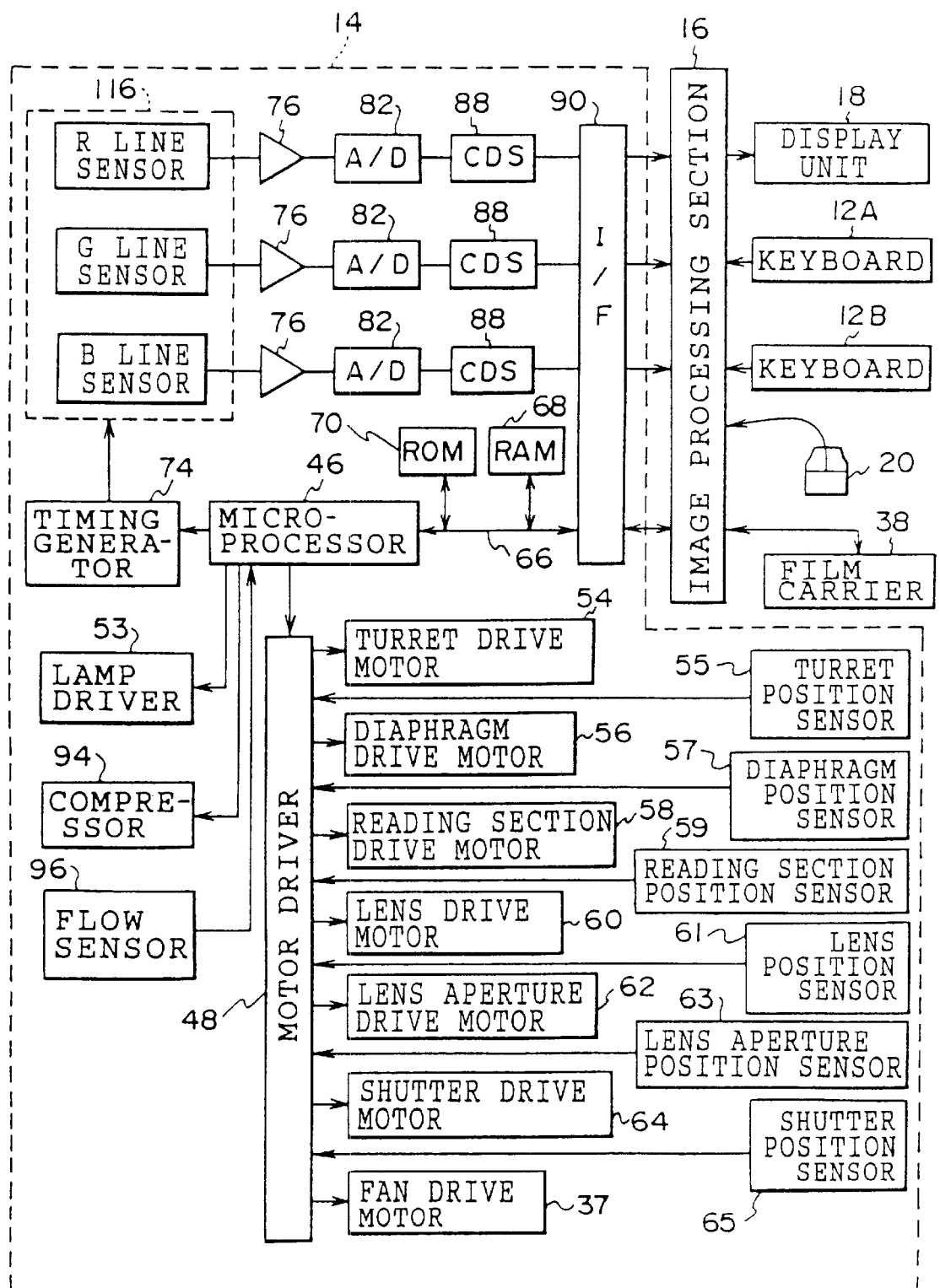
FIG. 6 is a block diagram showing the schematic structure of the electrical system of the image reading device according to an embodiment of the present invention.
Figure 7:
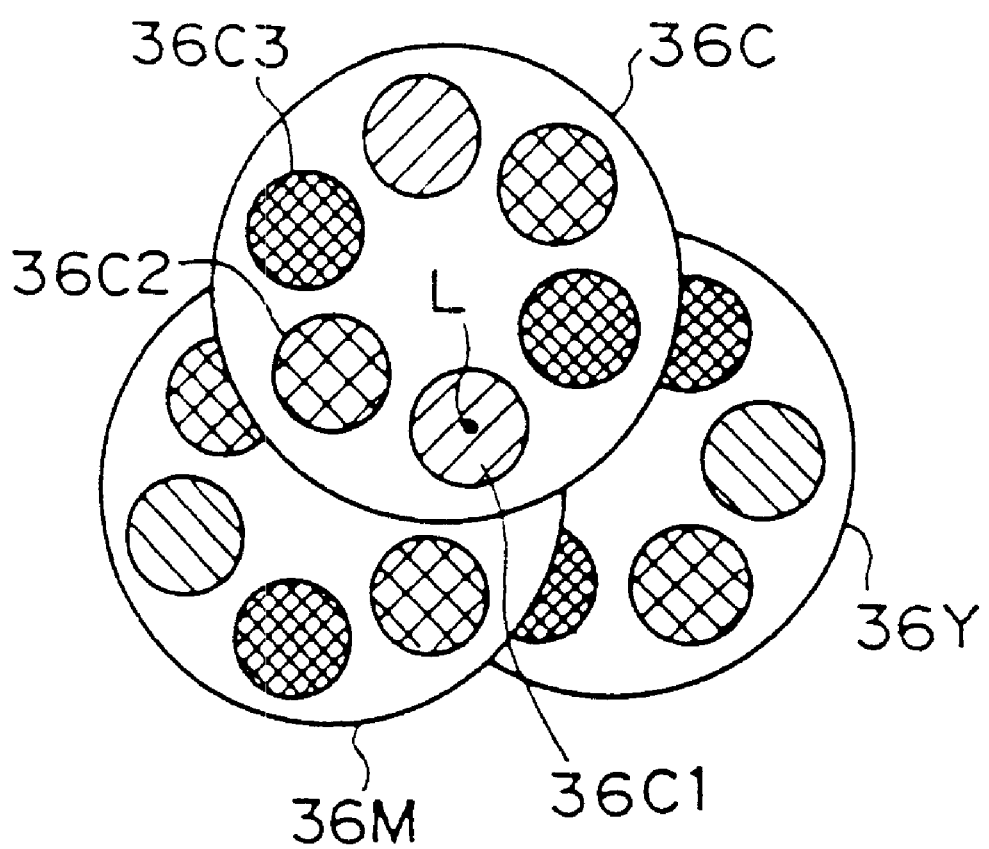
FIG. 7 is a diagram showing another example of a turret according to an embodiment of the present invention.

The above film extracting mechanism, the drive action of the motor, the timing of the reading and writing of the magnetic information by the magnetic information reading and writing section 410 are controlled by the image processing section 16 shown in FIG. 6. Two control programs are stored in this image processing section 16—one is a transport control program for performing magnetic information reading and prescanning when the film is withdrawn, and the other is a transport control program for performing magnetic information writing and fine scanning when the film is taken up.

Moreover, in the above film carrier 38S, not only an APS film 22S housed in a cartridge 402, but also a strip film extracted from a film case can be transported along the above described path by being inserted in the nipping portion of the pair of transporting rollers 404 as indicated by the dot-dash line in FIG. 8.

Note that each of the distance L1 between the perforation sensor 412A and the magnetic head 410W, the distance L2 between the magnetic head 410W and the linear CCD 116 scanning position (for an APS film), and the distance L3 between this scanning position and the perforation sensor 412B is an integral multiple (the multiple being 1×in the present embodiment) of the front pitch (referred to below as the "image frame pitch") which is a length between two adjacent front perforations. (In this embodiment, perforations are positioned at the left and right sides of an image frame. The terms "front perforation" and "back perforation" refer respectively to the perforation positioned at the left and at the right of an image frame.) Therefore, when an APS film 22S is transported in the take-up direction (the direction of the arrow Q), at the time when the perforation sensor 412A or perforation sensor 412B detects the front perforation 28 of an image frame, the leading edge of the image frame (the leading edge of the magnetic recording layer) one frame behind the image frame whose front perforation 28 is detected or the leading edge of the image frame (the leading edge of the magnetic recording layer) two frames ahead of the image frame whose front perforation 28 is detected is positioned at the writing magnetic head 410W.

(Film Transport Control)

The operation of the present embodiment will now be explained in accordance with the flow chart shown in FIG. 9.

Note that, taking an APS film 22 on which 40 frame images have been recorded as an example, the first frame of the APS film that is withdrawn from the cartridge 402 is taken as frame 1, and the frames on the APS film are thereafter taken as frame 2, frame 3, etc. down to frame 40.

In the explanation below, the term "magnetic information reading" indicates reading magnetic information such as whether or not a flash was used to take a photograph, the date of the photograph, the shutter speed, the exposure amount, and the like; the term "prescan of a frame image" indicates a preliminary scanning in which an image is read at a comparatively rough degree of reading accuracy in order to determine the values to be set (the reading conditions) for the fine scan to follow; the term "fine scan" indicates a final image reading at a high level of accuracy suitable for recording the image; and the term "magnetic information writing" indicates the writing of magnetic information expressing image processing conditions and the like for each frame image on the basis of the results of the prescan.

Figure 9:
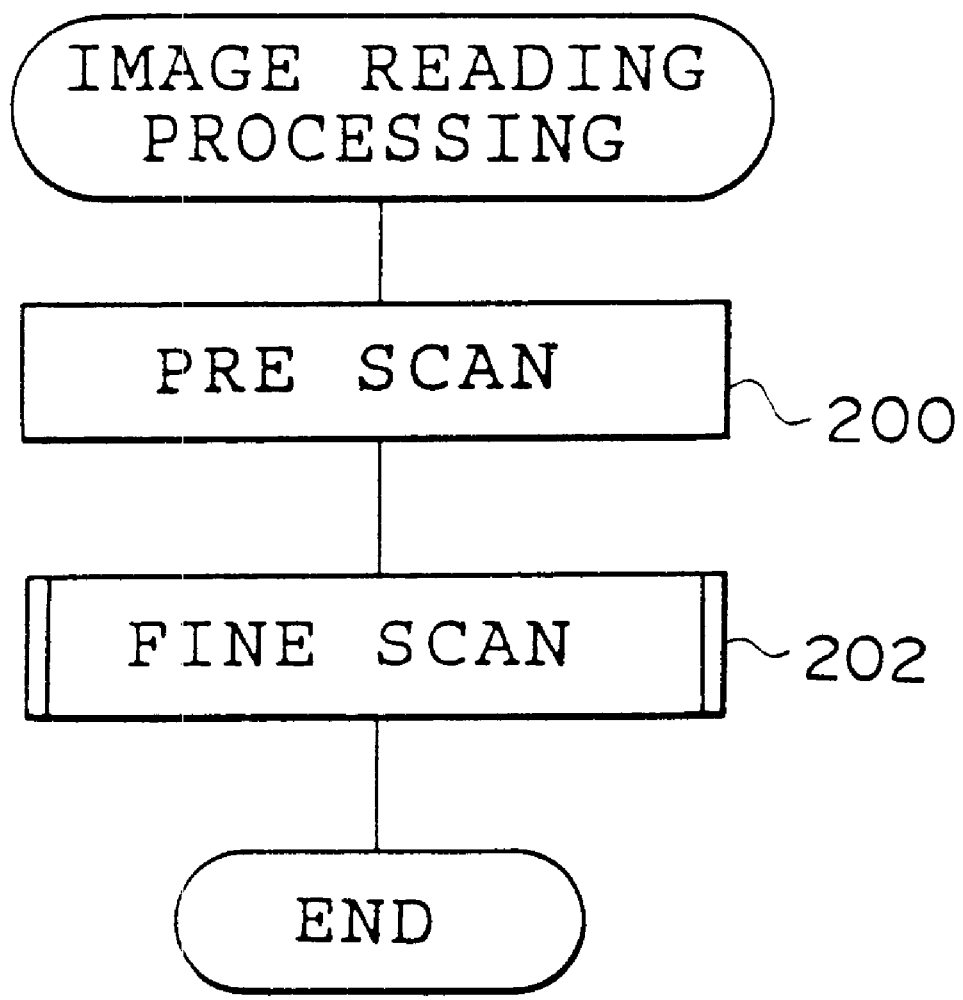
FIG. 9 is a flow chart showing the image reading process in the present embodiment.
Figure 10:
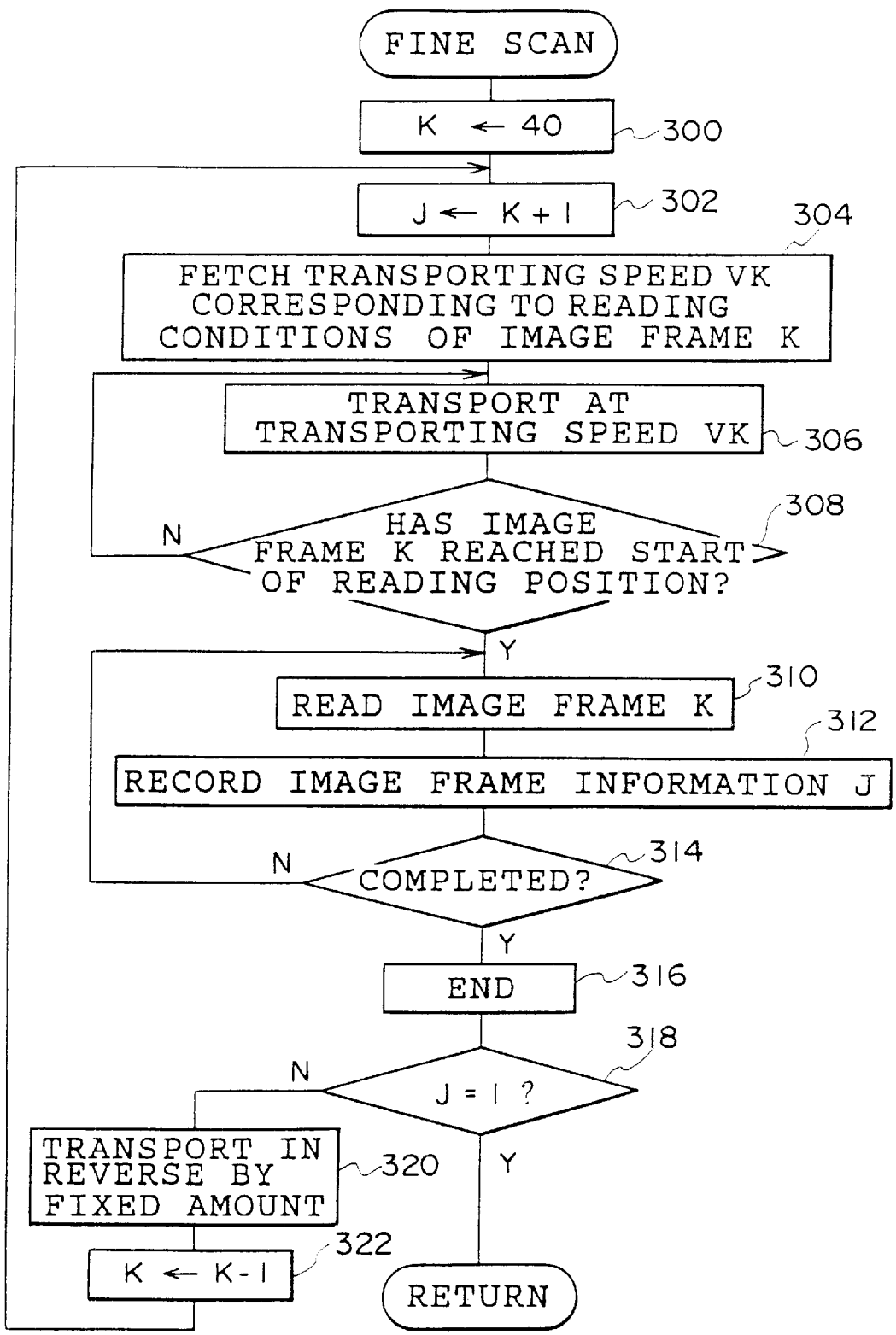
FIG. 10 is a flow chart showing the fine scan process according to the present embodiment.

When the operator has set the cartridge 402 at the predetermined position in the film carrier 38S and instructed via the keyboard 12B that the reading of the frame image be started, the image processing section 16 begins to execute the processing routines of the control processing shown in FIGS. 9 and 10.

Figure 11:
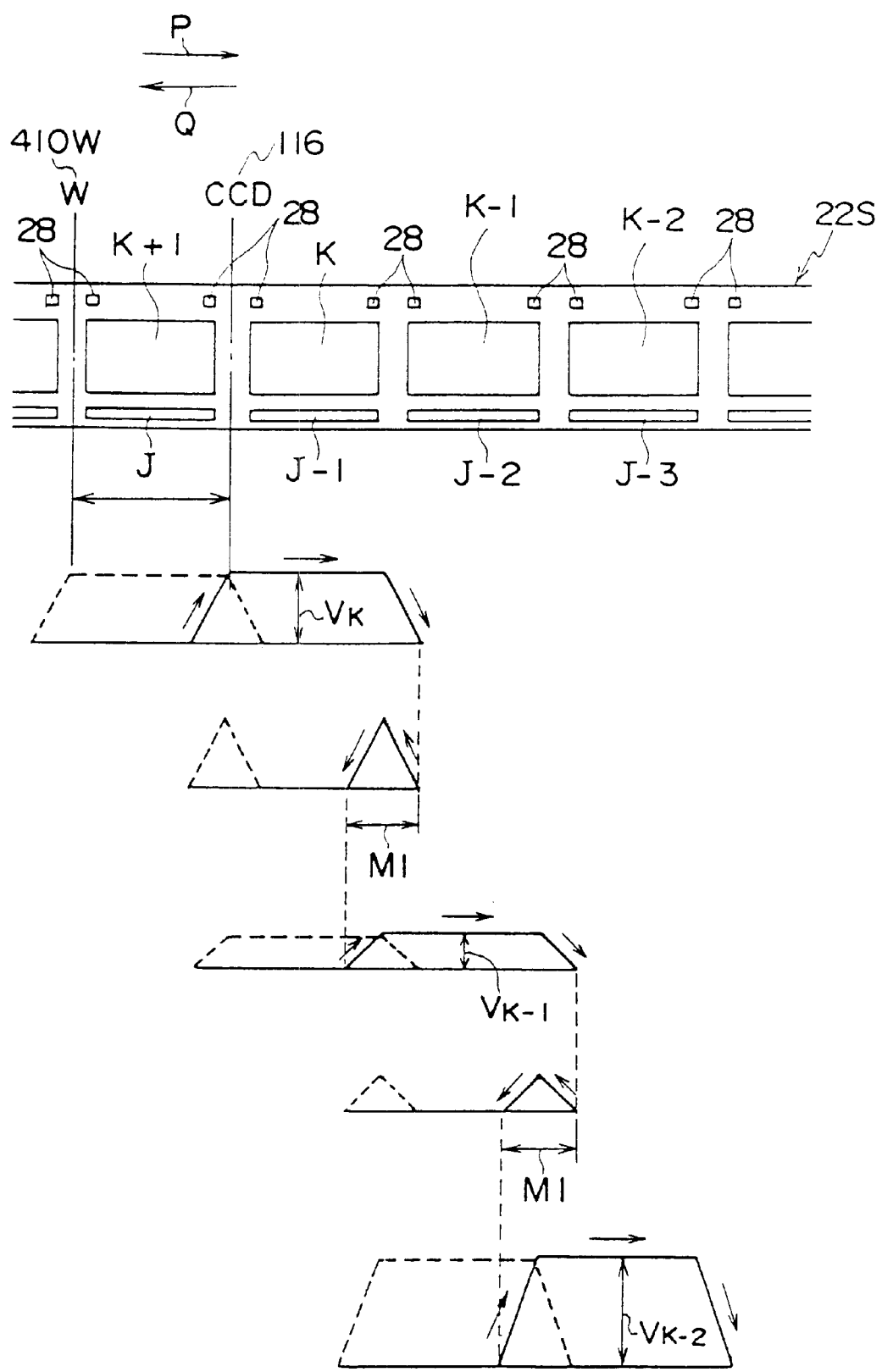
FIG. 11 is a diagram explaining the transportation of an APS film in the fine scan process according to the present embodiment.

The film transporting control will now be explained with reference to the flow charts of FIGS. 9 and 10 and to the conceptual views shown in FIG. 11. Note that an APS film 22 has a magnetic recording layer formed on the rear surface thereof, however, for convenience of explanation, the magnetic recording layer is shown as being on the front surface of the film in FIGS. 10 and 11.

In the film carrier 38, the APS film 22 is withdrawn from the cartridge 402 by an unillustrated film feed mechanism and transported in the direction of the withdrawal (the direction indicated by the arrow P) by the pair of transporting rollers 404. When the leading end of the APS film 22S is detected by the perforation sensor 412A, the APS film 22S is then transported at a constant speed, and the magnetic information of each image frame of the APS film 22S is read by the magnetic head 410R of the magnetic information reading and writing section 410. The APS film 22S is then prescanned at the scanning position by the linear CCD 116.

During the image reading, because the APS film 22S is held by the film supporting member 416, there is no sagging or vibration of the surface of the APS film 22S allowing the prescan to be appropriately carried out. After the APS film 22S has passed through the pair of transporting rollers 420, it is taken up by the temporary take-up portion 422.

Note that because a high level of reading accuracy is not required in the prescan, the APS film 22S can be transported at a constant speed and the reading of the magnetic information can also be performed at a constant speed.

At this time, the reading conditions for the fine scan and the image processing conditions are calculated and set for each frame image on the basis of the results of the prescan of each frame image. In this way, each frame image of the photographic film 22S from image 1 to image 40 is prescanned in sequence, and the reading conditions for the fine scan and the image processing conditions are set for each frame image on the basis of the results of the prescan.

The magnetic information and prescan image data are input into the image processing section 16 and stored in RAM 68. When the perforation in the terminal end of the APS film 22S is detected by the perforation sensor 412B, a determination is made that all the image frames have been prescanned. Therefore, the transporting of the APS film 22S in the direction of withdrawal is halted (step 200).

Next the APS film 22S is transported in the direction in which it is taken up (the direction indicated by the arrow Q) at a transporting speed determined for each image frame on the basis of the prescan image data. Each image frame is fine scanned and, at the same time, magnetic information is written by the magnetic head 410W of the magnetic information reading and writing section 410 (step 202).

This fine scan (step 202) will now be explained in detail with reference to FIGS. 10 and 11. Note that in FIG. 11, the state where the APS film 22S is being transported in the take-up direction (the direction indicated by the arrow Q) during fine scanning is expressed as a relative movement of the magnetic head 410W and the linear CCD 116 for the APS film 22S to the withdrawal direction (the direction of the arrow P). In FIG. 11, the solid line in FIG. 11 indicates the distance of the relative movement of the linear CCD 116 to the APS film 22S while the broken line indicates that of the magnetic head 410W. The vertical direction represents the speed.

Firstly, K is set to 40 (step 300). This is because the number of image frames on the APS film 22S being fine scanned is 40. Accordingly, should the number of image frames on the APS film 22S be different, the setting of K would also be different.

Next, the number of the area J, where the magnetic information is written, is set to K+1 (step 302). The reason for this is that, because the distance L2 between the magnetic head 410W and the scanning position of the linear CCD is equivalent to one image frame pitch, at the same time as the image of a particular image frame K is being read, image (magnetic) information is being written in the image frame K+1.

At this point, the transporting speed $V_K$ appropriate for the image frame K set in accordance with the reading conditions thereof is fetched (step 304).

In this case, the halted APS film 22S is accelerated until the APS film 22S is being transported at the transporting speed $V_k$ set on the basis of the reading conditions (step 306). Confirmation that the leading edge of the image frame K is positioned at the linear CCD 116 scanning position is made through the detection by the perforation sensor 412B of the front perforation 28 of the image frame K−1, or through the detection by the perforation sensor 412A of the front perforation 28 of the image frame K+2, and the image frame K is fine scanned by the linear CCD 116. (steps 308 and 310). At the same time, the magnetic information of the image frame K+1 is written in the magnetic recording area J by the magnetic head 410W (step 312).

The decision as to whether or not the fine scanning of the image frame K by the linear CCD 116 and the decision as to whether or not the writing of the magnetic information corresponding to the image frame K+1 are completed is made by the perforation sensor 412B detecting the back perforation of the image frame K−1 or by the perforation sensor 412A detecting the back perforation of the image frame K+2 (step 314). When the fine scan and the magnetic information writing are completed, the APS film 22S is halted at a predetermined deceleration (step 316).

Next, in step 318, a determination is made as to whether or not J=1, i.e. as to whether or not fine scanning of the final image frame and writing of the magnetic information in the final image frame are completed.

If the determination is negative, the fine scan and magnetic information writing are repeated (step 318). In this case, due to the deceleration, the next image frame K−1 of the APS film 22S ends up reaching the scanning position of the linear CCD 116. Therefore, the APS film 22S is transported in reverse for a predetermined distance (referred to below as "overrun distance") (step 320).

In this case, the APS film 22S is transported in such a manner that, as long as the transporting speed has not reached the transporting speed $V_{K-1}$ set by the reading conditions, the leading edge of the image frame (i.e. the leading edge of the image frame K−1) does not reach the linear CCD sensor scanning position. Namely, the leading edge of the frame image reaches the linear CCD sensor scanning position after the transporting speed of the APS film 22S has reached the transporting speed $V_{k-1}$. In this way, the APS film 22S is transported in reverse for the predetermined distance.

In step 322, K is reduced by one and the processes prior to step 302 are repeated. Thereafter, the APS film 22S is accelerated in the same way to the transporting speed $V_{k-1}$ of the image frame K−1 and, at the same time as the fine scan of the image frame K−1 from the image reading start position (the scanning position) is being performed, writing of the magnetic information corresponding to the image frame K is performed.

When the fine scanning and magnetic information writing for all image frames are completed (J=1), the APS film 22S is taken up into the cartridge 402.

According to the present embodiment as explained above, four processes are completed in one reciprocal transporting of the APS film 22S, namely, the reading of the magnetic information recorded on the APS film 22S and the prescan (outward transporting), as well as the fine scan and the writing of magnetic information to the APS film 22S (return transporting), thus improving the processing efficiency when these processes are performed.

In this case, because the distance L2 between the magnetic head 410W writing position and the scanning position of the linear CCD 116 is set as the image frame pitch, the fine scan image reading and the magnetic information writing can be started at the same time. Accordingly, the distance of the overrun M1 in the fine scan becomes due only to the acceleration or deceleration. Consequently, the distance of the overrun (the transporting time) is decreased allowing the APS film 22S processing time (i.e. the time taken for the fine scanning and the magnetic information writing) to be reduced (i.e. allowing the processing efficiency to be improved).

Figure 12:
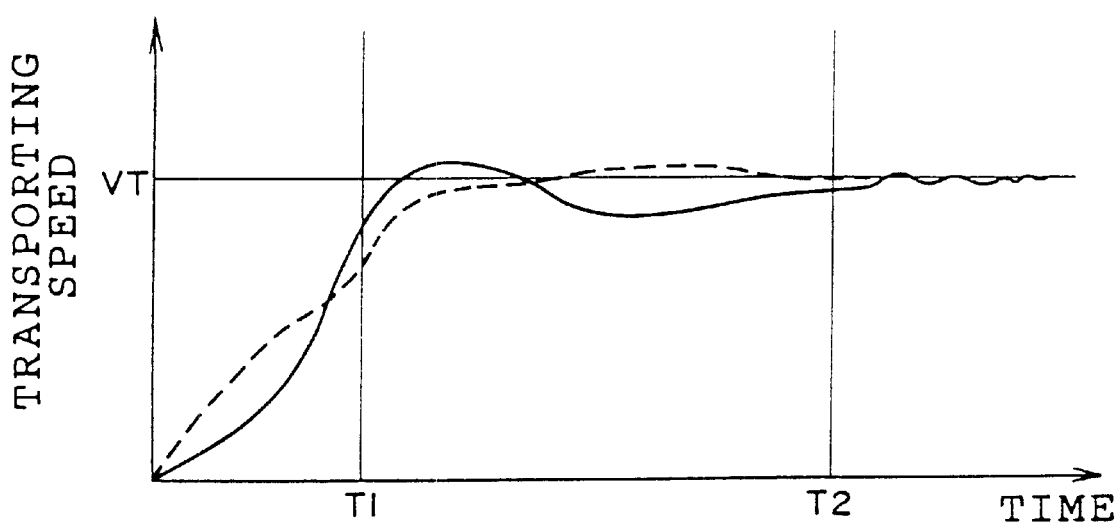
FIG. 12 is a diagram showing the transportation speed control state according to a present embodiment.

Moreover, in the present embodiment, the writing of the magnetic information was started at the same time as the reading of the image frame (the fine scanning), however, the writing of the magnetic information may be started prior to the reading of the image frame. Specifically, as is shown in FIG. 12, when the APS film 22S is accelerated to the transporting speed for fine scanning VT in order to perform the fine scanning, the transporting speed of the APS film 22S (the solid line) oscillates around the input signal (the broken line) as it converges with the transporting speed for fine scanning VT because of the effects of the motor characteristic and the like. In this case, the range where fine scanning is possible is where the transporting speed of the APS film 22S has converged to within 2% on either side of the fine scanning transporting speed VT. In contrast, the range where magnetic information writing is possible is where the transporting speed of the APS film 22S has converged to within 10% of the fine scanning transporting speed VT. Accordingly, the fine scanning cannot be performed until after the time T2 in FIG. 12 (the fine scanning can be performed after the time T2), while the magnetic information writing can be performed from the time T1 which precedes the time T2. By performing the writing of the magnetic information ahead of the fine scanning, in this way, the distance of the overrun caused by the magnetic information writing can be further reduced.

In the present case, the APS film 22 was decelerated and halted for each image frame, however, by bringing the APS film 22 to an abrupt stop, the distance of the overrun is reduced and the distance of the transporting in the reverse direction can be further shortened.

Figure 13:
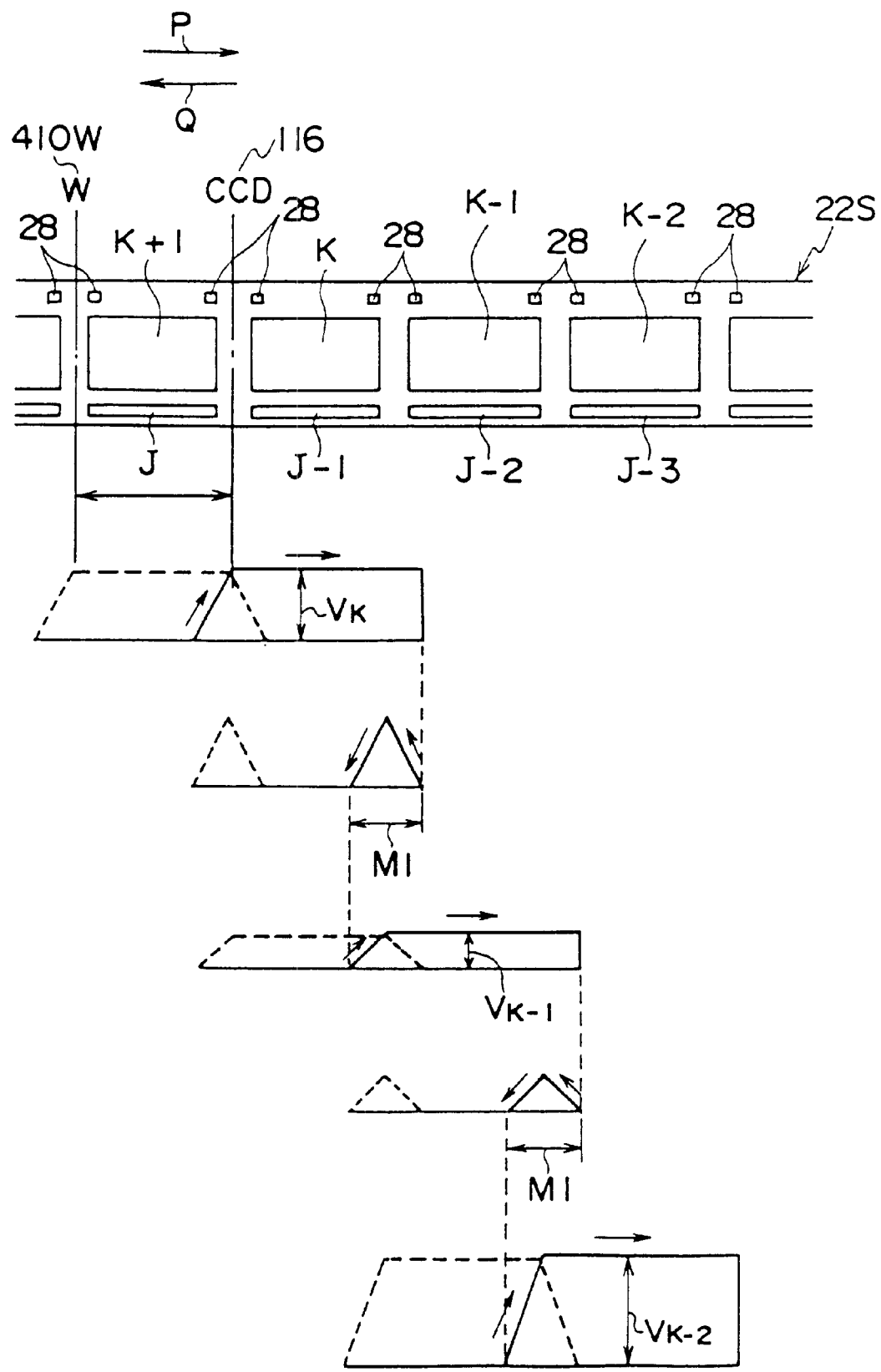
FIG. 13 is a diagram explaining the transportation of an APS film in the fine scan process according to a different embodiment.

Specifically, as is shown in FIG. 13, when an image frame K is fine scanned, the image frame K is transported at the transporting speed $V_K$ until the completion of the image reading is verified by the detection of the back perforation 28 of a image frame by the perforation sensor 412A or the perforation sensor 412B, and after that, the driving of the drive motor is stopped. As a result of this, the time taken before stopping is shortened compared with when the transporting speed is decreased before stopping, enabling the speed of the image reading process to be improved.

Note that mispositioning may be generated when the transporting is stopped, however, this can be remedied through the detection of the absolute position by detecting the perforation 28 with the perforation sensors 412A and 412B, and then correcting the mispositioning. Further, vibration may be generated when the transporting is stopped, however, because this is after the fine scanning is completed, there is no affect on the image reading.

As has been described above, in the present invention, when the processing of magnetic information and the reading of an image are performed during the same transporting movement, the image information carrier can be transported in a stable manner and the processing time can be reduced.

What is claimed is:

1. An image reading device which transports an elongated image information carrier on which a plurality of image frames are recorded and which is provided with a magnetic recording layer on which is recorded magnetic information, and which reads image information of each image frame, comprising:

a linear scanner which performs a prescan for preliminarily reading image information of each image frame and which performs a fine scan for reading image information of each image frame under reading condition set on the basis of image information obtained in the prescan;

a magnetic information reading and writing section which reads magnetic information on the magnetic recording layer during the prescan and writes magnetic information during the fine scan; and transporting means which transports the image information carrier during the prescan along a transporting path at a constant speed and which, for each image frame, transports the image information carrier during the fine scan along the transporting path at a speed set for each image frame in accordance with the reading condition and transports the image information carrier in a reverse direction of a transporting direction of the fine scan by a predetermined amount, wherein the writing of the magnetic information of each image frame is performed after the transporting speed of the image information carrier has converged to within a predetermined range with regard to the transporting speed for fine scanning set for each image frame.

2. The image reading device according to claim 1, wherein the magnetic information reading and writing section is disposed at a position where, at the same time as the linear scanner starts the fine scanning of one of the image frames, the writing of magnetic information for one of the image frames can be started.

3. The image reading device according to claim 1, wherein the magnetic information reading and writing section is disposed at a position where, at the same time as the linear scanner starts the fine scanning of one of the image frames, the writing of magnetic information for the same image frame can be started.

4. The image reading device according to claim 1, wherein the magnetic information reading and writing section is disposed at a position where, at the same time as the linear scanner starts the fine scanning of one of the image frames, the writing of magnetic information for another of the image frames can be started.

5. The image reading device according to claim 4, wherein the transporting of the image information carrier is stopped at the same time as the fine scanning of each image frame by the linear scanner and the writing of the magnetic information for each image frame have been completed.

6. The image reading device according to claim 1, wherein a distance between a writing position where magnetic information writing is performed on the image information carrier by the magnetic information reading and writing section and a reading position where image reading is performed on the image information carrier by the linear scanner is an integral multiple of a pitch of the image frame.

7. The image reading device according to claim 6, wherein the transporting of the image information carrier is stopped at the same time as the fine scanning of each image frame by the linear scanner and the writing of the magnetic information for each image frame have been completed.

8. The image reading device according to claim 1, wherein a distance between a writing position where magnetic information writing is performed on the image information carrier by the magnetic information reading and writing section and a reading position where image reading is performed on the image information carrier by the linear scanner is the pitch of the image frame.

9. The image reading device according to claim 1, wherein the transporting means carries out the transporting of the image information carrier in the reverse direction for the predetermined distance by accelerating the image information carrier and then, without transporting the image information carrier at a constant speed, decelerating the image information carrier.

10. The image reading device according to claim 1, wherein the transporting of the image information carrier is stopped at the same time as the fine scanning of each image frame by the linear scanner and the writing of the magnetic information for each image frame have been completed.

11. The image reading device according to claim 1, wherein the predetermined range is ±10% of the transporting speed for scanning.

12. The image reading device according claim 1, further comprising a perforation sensor which detects a back perforation of each image frame.

13. An image reading device which transports an elongated image information carrier on which a plurality of image frames are recorded and which is provided with a magnetic recording layer on which is recorded magnetic information, and which reads image information of each image frame, comprising:

a linear scanner which performs a prescan for preliminarily reading image information of each image frame and which performs a fine scan for reading image information of each image frame under reading condition set on the basis of image information obtained in the prescan;

a magnetic information reading and writing section which reads magnetic information on the magnetic recording layer during the prescan and writes magnetic information during the fine scan; and transporting means which transports the image information carrier during the prescan along a transporting path at a constant speed and which, for each image frame, transports the image information carrier during the fine scan along the transporting path at a speed set for each image frame in accordance with the reading condition and transports the image information carrier in a reverse direction of a transporting direction of the fine scan by a predetermined amount, wherein the fine scan for each image frame is performed after the transporting speed of the image information carrier has converged to within a first predetermined range with regard to the transporting speed for fine scanning set for respective image frames, the writing of the magnetic information of each image frame is performed after the transporting speed of the image information carrier has converged to within a second predetermined range with regard to the transporting speed for fine scanning set for the respective image frames, and the second predetermined range is set wider than the first predetermined range.

14. An image reading device according to claim 13, wherein the writing of the magnetic information beins prior to starting of the fine scanning.

* * * * *